United States Patent
Ohshita

[11] Patent Number: 5,132,838
[45] Date of Patent: Jul. 21, 1992

[54] KEPLERIAN ZOOM FINDER OPTICAL SYSTEM

[75] Inventor: Koichi Ohshita, Tokyo, Japan
[73] Assignee: Nikon Corporation, Tokyo, Japan
[21] Appl. No.: 769,819
[22] Filed: Oct. 2, 1991

[30] Foreign Application Priority Data

Oct. 15, 1990 [JP] Japan .................. 2-275720

[51] Int. Cl.$^5$ .................. G02B 23/14; G02B 15/177; G02B 13/02
[52] U.S. Cl. .................. 359/432; 359/422; 359/682; 359/691
[58] Field of Search .................. 359/432, 422, 682, 691

[56] References Cited

U.S. PATENT DOCUMENTS

| | | | |
|---|---|---|---|
| 4,195,912 | 4/1980 | Doi et al. | 359/682 |
| 4,579,428 | 4/1986 | Fujioka | 359/682 |
| 5,005,955 | 4/1991 | Ohshita | 350/423 |

FOREIGN PATENT DOCUMENTS 2-109009 4/1990 Japan .

Primary Examiner—Jon W. Henry
Attorney, Agent, or Firm—Shapiro and Shapiro

[57] ABSTRACT

In a Keplerian zoom finder optical system including an objective lens unit having a magnification changing function and having positive refractive power, and an eyepiece unit having positive refractive power for enlarging and observing therethrough a real image formed by the objective lens unit, the objective lens unit has, in succession from the object side, a forward from the object side, a forward group comprising a negative first lens and a positive meniscus-shaped second lens having its convex surface facing the object side, and having negative refractive power as a whole, and a rearward group comprising a biconvex positive third lens and a positive meniscus-shaped fourth lens having its convex surface facing the image side, and having positive refractive power as a whole, the spacing between the forward group and the rearward group being changed to thereby accomplish finder magnification change. The objective lens unit is designed to satisfy the following conditions:

$$-0.12 < r_7/f_4 < -0.05$$

$$30 < \nu_1 < 45,$$

where
- $r_7$: the radius of curvature of that surface of the fourth lens in the rearward group which is adjacent to the optical side,
- $f_4$: the focal length of the fourth lens in the rearward group,
- $\nu_1$: the Abbe number of the first lens in the forward group.

19 Claims, 3 Drawing Sheets

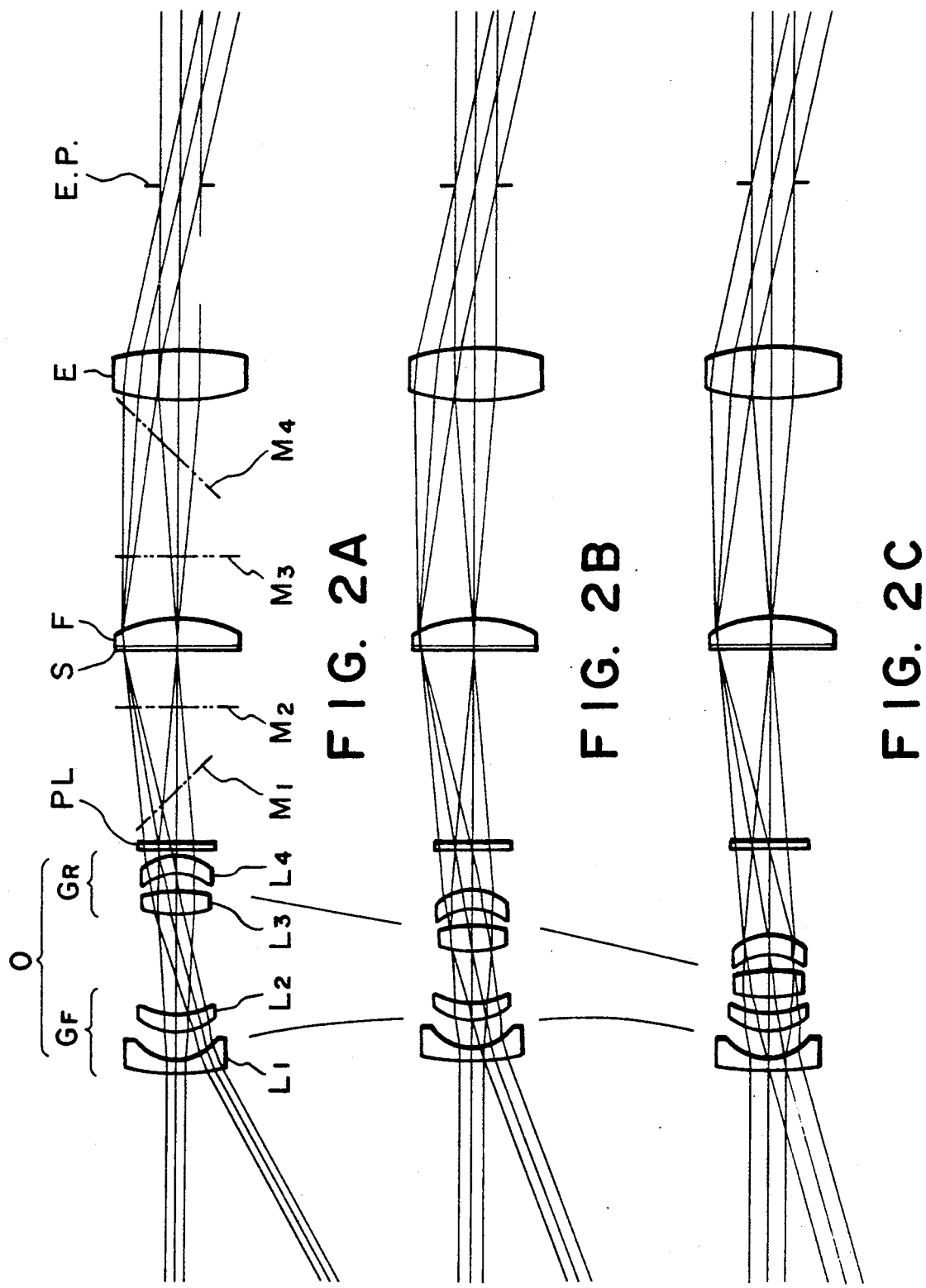

KEPLERIAN ZOOM FINDER OPTICAL SYSTEM

BACKGROUND OF THE INVENTION

1. Field of the Invention

This invention relates to a magnification-changeable finder optical system, and particularly to a Keplerian zoom finder optical system suitable for use in a compact camera.

2. Related Background Art

In recent years, in lens shutter type compact cameras, zoom lenses having a great zoom ratio have been required as photo-taking objective lenses, and with it, zoom finders having a great magnification change ratio have become necessary also in camera finders.

As zoom finders of this kind, there are Japanese Laid-Open Patent Application No. 2-109009 which has been proposed by the applicant and already laid open, etc., and basically, these are such that the objective lens of a Keplerian telescope optical system in which a real image formed by the objective lens is enlarged and observed through an eyepiece is made into zoom, whereby the finder magnification is made continuously changeable.

The zoom finder disclosed in the above-mentioned Japanese Laid-Open Patent Application No. 2-109009 has a magnification change ratio (zoom ratio) of the order of 2.3 times and a field (angle of field) of the order of 55 degrees at the wide angle end and has an excellent optical performance.

This zoom finder, however, can hardly be said to be sufficient in respect of wide angle and high magnification change, and further, an attempt to endow this zoom finder with a great magnification change ratio has resulted in the possibility of making the finder optical system bulky.

SUMMARY OF THE INVENTION

So, the present invention has as its object the provision of a finder which realizes an angle of view (field) amounting to 64 degrees at the wide angle end and a high magnification change amounting to the order of 2.45 times and yet is compact and high in performance.

To achieve the above object, the finder optical system of the present invention is a Keplerian zoom finder optical system including an objective lens unit of positive refractive power having a magnification changing function, and an eyepiece unit of positive refractive power for enlarging and observing therethrough a real image formed by said objective lens unit, said objective lens unit having a forward group of negative refractive power and a rearward group of positive refractive power, said forward group comprising, in succession from the object side, a first lens of negative refractive power and a positive meniscus-shaped second lens having its convex surface facing the object side, said rearward group comprising, in succession from the object side, a biconvex third lens and a positive meniscus-shaped fourth lens having its convex surface facing the image side, the spacing between said forward group and said rearward group being changed to thereby vary the combined focal length thereof and vary the finder magnification, said finder optical system basically satisfying the following conditions:

$$-0.12 < r_7/f_4 < -0.05,\ r < 0,\ f_4 > 0 \qquad (1)$$

$$30 < \nu_1 < 45 \qquad (2)$$

where
- $r_7$: the radius of curvature of that surface of the fourth lens which is adjacent to the object side,
- $f_4$ the focal length of the fourth lens,
- $\nu_1$ the Abbe number of the first lens.

By constructing the fourth lens so as to satisfy condition (1) above, it becomes possible to correct coma well and make the relative aperture of the objective lens unit great. Also, by constructing the first lens so as to satisfy condition (2) above, it becomes possible to correct well chromatic aberration which tends to be increased by the finder system being made compact.

Also, it is desirable to construct the third lens so as to satisfy the following condition, in addition to constructing the fourth lens so as to satisfy condition (1).

$$0.2 < d_5 < f_w < 0.27, \qquad (3)$$

where
- $d_5$: the on-axis thickness of the third lens,
- $f_w$: the combined focal length of the forward unit and the rearward unit in the objective lens at the wide angle end.

By constructing the third lens so as to satisfy this condition (3), it is possible to achieve the compatibility of the high magnification change and compactness of the finder system.

Furthermore, it is desirable to construct the negative first lens so that the refractive index $n_1$ may satisfy the following condition, in addition to constructing the fourth lens so as to satisfy condition (1).

$$1.53 < n_1 < 1.60. \qquad (4)$$

By constructing the first lens so that the refractive index thereof may satisfy condition (4), it is possible to correct the distortion at the wide angle end and the coma at the telephoto end well at a time, and also it becomes possible to reduce cost by using a plastic material for the lenses constituting the finder system.

According to the present invention constructed as described above, there can be achieved a compact Keplerian finder having a wide angle and a high magnification change rate which could never be achieved before.

Other objects, features and effects of the present invention will become fully apparent from the following detailed description of the invention taken in conjunction with the accompanying drawings.

BRIEF DESCRIPTION OF THE DRAWINGS

FIGS. 2A to 2C are optical path views ,, showing the construction of an optical system in a second embodiment of the present invention except an erect system and the moved states of lenses during a magnification change.

DETAILED DESCRIPTION OF THE PREFERRED EMBODIMENTS

Figure 1A:
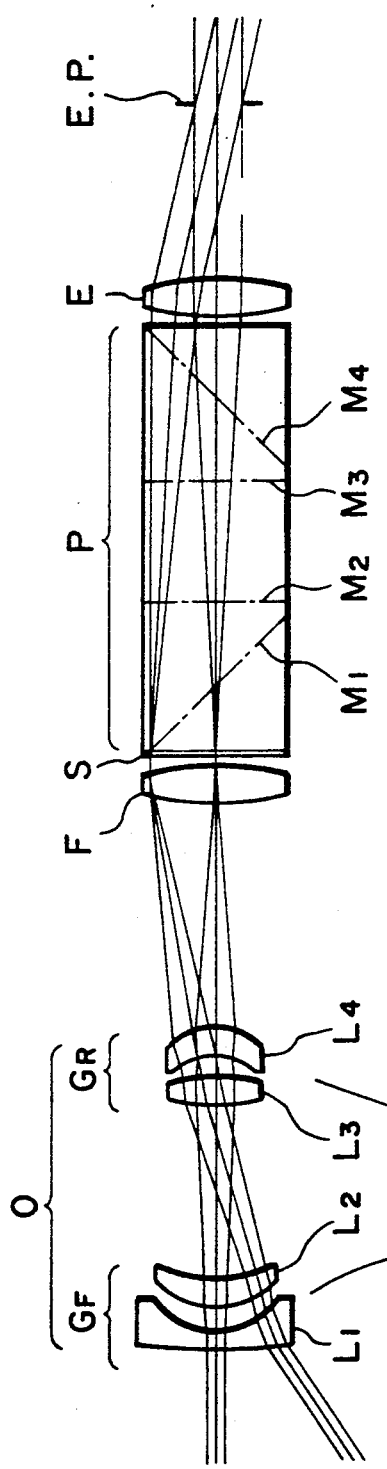
FIGS. 1A to 1C are optical path views showing the construction of an optical system in a first embodiment of the present invention and the moved states of lenses during a magnification change.

FIGS. 1A to 3C show the optical paths of first, second and third embodiments, respectively, of the present invention, and in each of these figures, (a) shows the optical path in a minimum magnification state (wide angle end), (b) shows the optical path in a mean magnification state, and (c) shows the optical path in a maximum magnification state (telephoto end).

As shown, the zoom finder according to each embodiment of the present invention is of a construction basically having, in succession from the object side, an objective lens unit (a zoom objective lens unit) 0 comprising four lenses and having a magnification changing function, a field lens unit (field lens) F comprising a single positive lens, and an eyepiece unit E comprising a single biconvex positive lens.

The objective lens unit 0 comprises two groups, i.e., a forward group $G_F$ having negative refractive power and a rearward group $G_R$ having positive refractive power, and the forward group $G_F$ comprises, in succession from the object side, a first lens $L_1$ having negative refractive power and a positive meniscus-shaped second lens $L_2$ having its convex surface facing the object side, and the rearward group $G_R$ comprises, in succession from the object side, a biconvex third lens $L_3$ and a positive meniscus-shaped fourth lens $L_4$ having its convex surface facing the image side. The magnification change from the wide angle end (the minimum magnification state) to the telephoto end (the maximum magnification state) is accomplished by varying the spacing between the forward group $G_F$ and the rearward group $G_R$ for decrease. Specifically, the forward group $G_F$ moves while describing a U-turn locus, and the rearward group $G_R$ moves nonrectilinearly toward the object side.

As described above, the Keplerian zoom finder of the present invention is basically of a construction in which the spatial image (intermediate image) of an object is formed by a zoom objective lens comprised of at least two negative and positive groups and the spatial image is enlarged and observed through an eyepiece. If also has a construction in which the spacing between the forward group $G_F$ of negative refractive power and the rearward group $G_R$ of positive refractive power which constitute the zoom objective lens is varied, whereby the finder magnification can be continuously changed.

In such a zoom finder, to achieve compactness farther than before, it is necessary to strengthen the refractive powers of the objective lens 0 and the eyepiece E, but this involves a great difficulty from two problems shown below.

A first problem is that enhancing the refractive power of each lens means that the real image (spatial image) formed by the objective lens unit 0 becomes smaller and it is enlarged and observed through the eyepiece unit E and therefore, the aberrations of the objective lens unit 0 and the eyepiece unit E are more enlarged.

A second problem is that to obtain a predetermined large pupil diameter, a zoom objective lens of greater relative aperture becomes necessary and this may result in the bulkiness of the finder system.

So, the present invention has found that the following conditions (1) and (2) are further satisfied in the above-described basic construction, whereby the above-noted difficult problems are solved.

$$-0.12 < r_7/f_4 < -0.05, \; r_7 < 0, \; f_4 > 0 \quad (1)$$

$$30 < \nu_1 < 45, \quad (2)$$

wherein $r_7$: the radius of curvature of that surface of the fourth lens which is adjacent to the object side, $f_4$: the focal length of the fourth lens, $\nu_1$: the Abbe number of the first lens.

Conditional expression (1) prescribes the optimum radius of curvature of that surface of the positive meniscus-shaped fourth lens $L_4$ which is adjacent to the object side, and this is concerned in good correction of coma. If the lower limit of this condition is exceeded, the correction of distortion and coma at the wide angle end will become difficult. If conversely, the upper limit of this condition is exceeded, the occurrence of high-order spherical aberrations will become remarkable and it will become impossible to make the relative aperture of the objective lens unit great.

Conditional expression (2) defines the optimum range of dispersion regarding the first lens $L_1$ having negative refractive power, and this is directed to good correction of the chromatic aberration of the finder system.

If the upper limit of this condition is exceeded, the first lens $L_1$ will become low in dispersion and the correction of on-axis chromatic aberration which will be greatly increased by making the power distribution of each unit of the finder system great and making the system compact will be difficult. If conversely, the lower limit of this condition is exceeded, the first lens $L_1$ will become high in dispersion and the occurrence of chromatic difference of magnification at the wide angle end will be remarkable.

Also, it is desirable to construct the third lens so as to satisfy the following condition, in addition to constructing the fourth lens so as to satisfy condition (1).

$$0.2 < d_5/f_w < 0.27, \quad (3)$$

where $d_5$: the on-axis thickness of the third lens, $f_w$: the combined focal length of the forward and rearward groups in the objective lens at the wide angle end.

Conditional expression (3) prescribes the on-axis thickness of the biconvex third lens $L_3$, and is for achieving the compatibility of high magnification change and compactness. If the upper limit of this condition is exceeded, the on-axis thickness of the third lens $L_3$ will increase and this will go against compactness and will further shorten the lens spacing and thus, it will become difficult to keep the spacing between the groups which is necessary for a magnification change. If conversely, the lower limit of this condition is exceeded, the appropriate on-axis thickness of the third lens $L_3$ cannot be secured and therefore, it will be difficult to make the relative aperture of the objective lens 0 great.

Furthermore, to accomplish good aberration correction, it is desirable to construct the negative first lens so that the refractive index $n_1$ thereof may satisfy the following condition, in addition to constructing the fourth lens so as to satisfy condition (1).

$$1.53 < n_1 < 1.60 \quad (4)$$

If the lower limit of this condition is exceeded, it will become difficult to correct the distortion at the wide angle end and the coma at the telephoto end well at a time, and if conversely, the upper limit of this condition is exceeded, it will become impossible to use an inexpensive plastic material for the lenses constituting the finder system and achieve a reduction in cost.

Also, to correct aberrations better, it is desirable to construct the first lens so that the focal length $f_1$ thereof may satisfy the following condition, in addition to construct the first lens so as to satisfy condition (4).

$$-1.2 < f_1/f_w < -0.8, \quad (5)$$

where $f_w$: the combined focal length of the forward and rearward groups in the objective lens at the wide angle end.

Condition (5) prescribes the appropriate refractive power distribution of the negative first lens $L_1$ and the positive second lens $L_2$ in the forward group $G_F$ having negative refractive power, and this is directed to good correction of distortion and coma. If the upper limit of condition (5) is exceeded, the correction of the coma at the telephoto end will be difficult, and if conversely, the lower limit of this condition is exceeded, the negative distortion at the wide angle end will become very great and difficult to correct.

Now, of course, there is a limit in strengthening the refractive powers of the objective lens unit 0 and the eyepiece unit E. This is because if the refractive powers of these units are strengthened too much, an appropriate eye point position and an appropriate pupil diameter will not be obtained. In the case of the present invention, the limit is $$8.5 \text{ mm} < f_w < 11 \text{ mm}, \quad (6)$$

where $f_w$ is the combined focal length of the forward group $G_F$ and rearward group $G_R$ in the objective lens unit at the wide angle end (minimum magnification state). If the upper limit of this condition is exceeded, it will become difficult to make the finder system compact, and if conversely, the lower limit of this condition is exceeded, the pupil diameter will become small or the distance from the last surface of the eyepiece unit E to the eye point E.P. will become short and the image formed by the objective lens unit 0 will become very difficult to observe. Also, the finder magnification will be reduced and a reduction in the specification of the finder will be unavoidable.

Further, to achieve good aberration correction, it is more desirable that surface of the negative first lens $L_1$ which is adjacent to the image side and that surface of the positive meniscus-shaped fourth lens $L_4$ which is adjacent to the image side be made into aspherical surfaces and that those aspherical surfaces satisfy the following conditions:

$$0.188 \cdot r_2 < S_2(0.6 \cdot r_2) < 0.198 \cdot r_2 \quad (7)$$

$$0.03 \cdot r_8 < S_8(0.25 \cdot r_8) < 0.0316 \cdot r_8, \quad (8)$$

where $S_2(y)$ and $S_8(y)$ indicate the shapes of the aspherical surface of the first lens $L_1$ which is adjacent to the image side and the aspherical surface of the fourth lens $L_4$ which is adjacent to the image side, respectively, and these indicate the distances from the tangential planes on the verteces of the respective aspherical surfaces at a height y in the vertical direction from the optical axis in the aspherical surfaces, along the direction of the optical axis. $r_2$ and $r_8$ represent the paraxial radii of curvature of the aspherical surface of the first lens $L_1$ which is adjacent to the image side and the aspherical surface of the fourth lens $L_4$ which is adjacent to the image side, respectively.

Generally, however, an aspherical surface can be expressed by the following polynominal:

$$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} \cdot y^{10},$$

where k is the cone coefficient, $A_n$ is the nth-order aspherical surface coefficient and R is the standard radius of curvature. The above-mentioned paraxial radius of curvature r is indicated as $r = 1/(2.A_3 + 1/R)$.

Conditional expression (7) is for correcting distortion well. If the upper limit of this condition is exceeded, the effect of the aspherical surfaces will become meager and good correction of distortion will become difficult. If conversely, the lower limit of this condition is exceeded, the effect of the aspherical surfaces will become excessive and astigmatism will occur very greatly and the correction thereof will become difficult.

Conditional expression (8) is concerned in good correction of the spherical aberration at the telephoto end. If the upper limit of this condition is exceeded, the effect of the aspherical surfaces will become small and therefore, the correction of negative spherical aberration will become difficult. If conversely, the lower limit of this condition is exceeded, the effect of the aspherical surfaces will become excessive and positive spherical aberration will become remarkable and the correction thereof will become difficult.

Figure 1B:
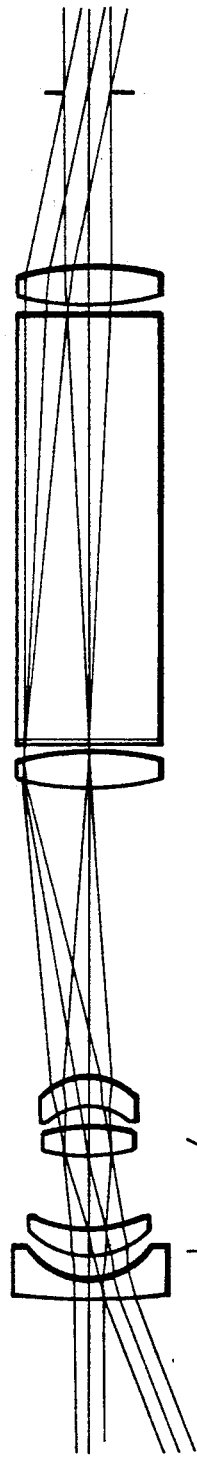
Figure 1C:
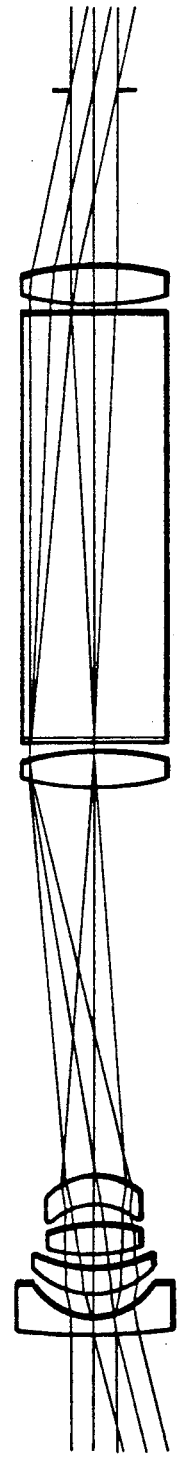
Figure 3A:
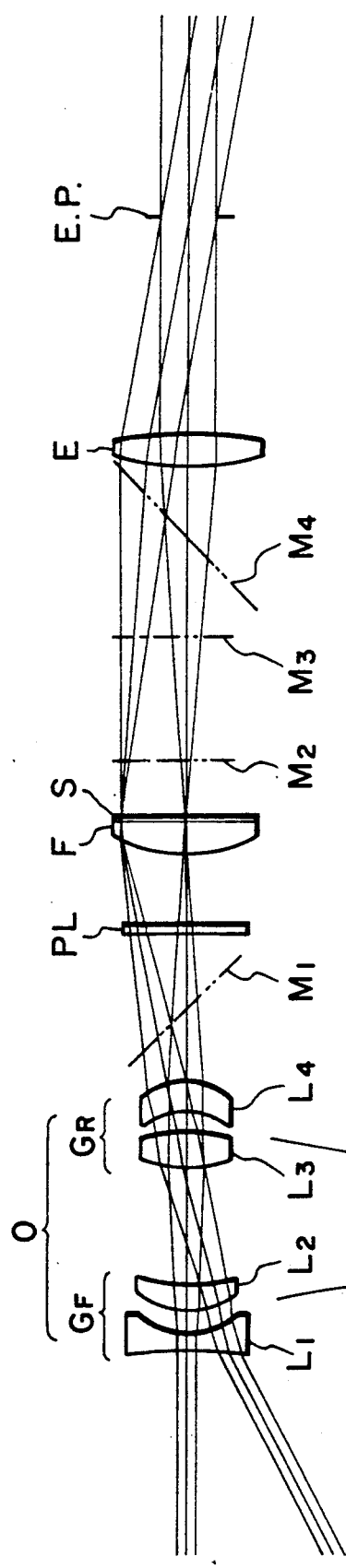
FIGS. 3A to 3C are optical path views showing the construction of an optical system in a third embodiment of the present invention except an erect system and the moved state of lenses during a magnification change.
Figure 3B:
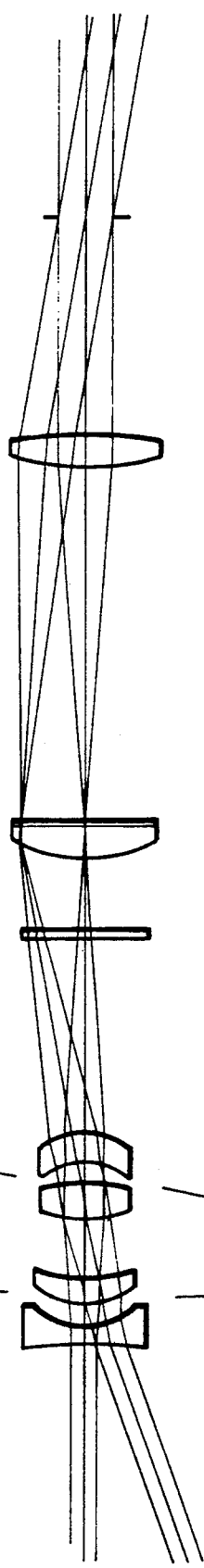
Figure 3C:
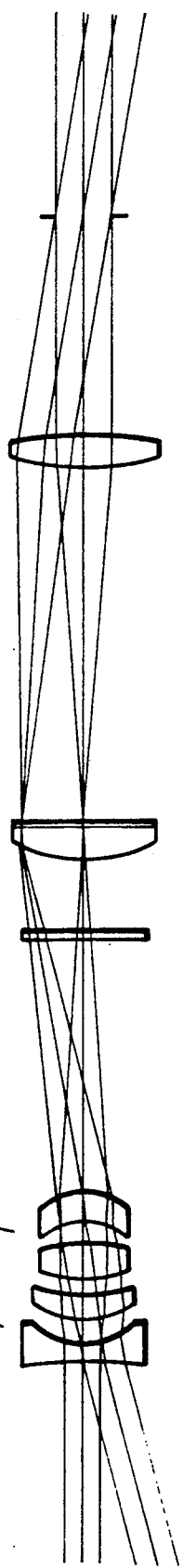

In the first embodiment shown in FIG. 1, the image formed by the objective lens 0 is imaged through the field lens unit F on a field frame s formed on that surface of a prism P for making the image erect. Making the image erect is accomplished by total four times of reflection by four reflecting surfaces $M_1$, $M_2$, $M_3$ and $M_4$ provided in the prism P and schematically shown by dots-and-dash lines. The reflecting surface $M_2$ is obliquely provided with rotation by 90° about the optical axis relative to the reflecting surface $M_1$, and the reflecting surface $M_3$ is obliquely provided so as to be orthogonal to the reflecting surface $M_2$. Alternatively, a reflecting surface may be obliquely provided in the space between the objective lens 0 and the field lens unit F and three reflecting surfaces may be provided in the prism P so that making the image erect may be accomplished by total four times of reflection.

In the second embodiment shown in FIG. 2, the field lens F is comprised of a plano-convex lens having its convex surface facing the image side, and is disposed so that the planar surface side thereof may coincide with the focal plane of the objective lens 0. Also, the field frame s is formed on the planar surface side of the plano-convex field lens F. Further, a protective window PL is provided on the eye point E.P. side near the objective lens 0 to prevent any dust which comes into the objective lens 0 side due to the movement of the objective lens during a magnification change from adhering to the field frame s. Making the image erect in this second embodiment is accomplished by total four times of reflection by two reflecting surfaces $M_1$ and $M_2$ provided in the space between the protective window PL and the field lens F and two reflecting surfaces $M_3$ and $M_4$ provided in the space between the field lens F and the eyepiece E.

The values of the numerical data of the respective embodiments of the present invention will be shown in Tables 1 to 3 below. In the tables below, the numbers at the left end represent the surface numbers, r represents the radius of curvature, d represents the inter-surface spacing, n represents the refractive index for d-lines ($\lambda = 587.6$ nm), $\nu$ represents the Abbe number, x represents the visibility (diopters), m represents the magnification, $\omega$ represents the angle of incidence (°), and E.P. represents the eye point. Also, the aspherical surfaces are indicated by the mark * at the right of the surface numbers, and the shape of these aspherical surfaces is represented by the aforementioned expressions of the aspherical surface,

TABLE 1

(1st Embodiment)

$x = -1.00$ Diopter    $m = 0.377x - 0.928x$
$2\omega = 64.0° - 25.8°$

| | r | d | $\nu$ | n | |
|---|---|---|---|---|---|
| 1 | 79.9325 | 1.3000 | 33.08 | 1.56440 | |
| 2* | 5.5345 | 2.1000 | | 1.00000 | $G_F$ |
| 3 | 6.9037 | 2.3000 | 57.57 | 1.49108 | |
| 4 | 11.3510 | (variable) | | 1.00000 | |
| 5 | 12.6894 | 2.6000 | 57.57 | 1.49108 | |
| 6 | −19.0105 | 1.6000 | | 1.00000 | $G_R$ |
| 7 | −5.2294 | 2.4000 | 57.57 | 1.49108 | |
| 8* | −5.0604 | (variable) | | 1.00000 | |
| 9 | 23.0000 | 3.2000 | 57.57 | 1.49108 | F |
| 10 | −23.0000 | 0.6000 | | 1.00000 | |
| 11 | ∞ | 0.2000 | | 1.00000 | s |
| 12 | ∞ | 36.7500 | 56.05 | 1.56882 | P |
| 13 | ∞ | 0.5000 | | 1.00000 | |
| 14* | 20.9880 | 3.2000 | 57.57 | 1.49108 | E |
| 15 | −30.0120 | 15.0000 | | 1.00000 | |
| 16 | E.P. | | | 1.00000 | |
| m | 0.3773 | 0.5935 | 0.9276 | | |
| d4 | 14.6017 | 6.1780 | 0.8823 | | |
| d8 | 19.1186 | 24.5082 | 32.8375 | | |

2nd surface (aspherical surface)

Standard radius of curvature: $R_2 = 5.5345$
Cone coefficient: $k = 0.76$
Aspherical surface coefficient
$C_2 = 0.0$
$C_4 = -1.76970 \times 10^{-5}$,    $C_6 = 4.51780 \times 10^{-6}$
$C_8 = -1.85900 \times 10^{-7}$,    $C_{10} = 1.55690 \times 10^{-10}$ 8th surface (aspherical surface)

Standard radius of curvature: $R_8 = -5.0604$
Cone coefficient: $k = 0.44$
Aspherical surface coefficient
$C_2 = 0.0$
$C_4 = -2.02980 \times 10^{-5}$,    $C_6 = -3.70760 \times 10^{-6}$
$C_8 = -3.08070 \times 10^{-8}$,    $C_{10} = 7.84670 \times 10^{-10}$ 14th surface (aspherical surface)

Standard radius of curvature: $R_{14} = 20.9880$
Cone coefficient: $k = -1.35$
Aspherical surface coefficient
$C_2 = 0.0$,    $C_4 = 0.0$,    $C_6 = 0.0$
$C_8 = -3.00000 \times 10^{-10}$,    $C_{10} = 0.0$ $\nu_1 = 33.1$,    $r_7/f_4 = 0.0931$,    $d_5/f_w = 0.252$
$f_1/f_w = -1.026$,    $n_1 = 1.563$,    $f_w = 10.33$
$S_2(0.6 \cdot r_2)/r_2 = 0.1946$
$S_8(0.25 \cdot r_8)/r_8 = 0.03148$

TABLE 2

(2nd Embodiment)

$x = -0.70$ Diopter    $m = 0.449x - 0.828x$
$2\omega = 55.5° - 30.2°$

| | r | d | $\nu$ | n | |
|---|---|---|---|---|---|
| 1 | 23.8970 | 1.1000 | 40.57 | 1.53636 | |
| 2* | 4.4750 | 2.8000 | | 1.00000 | $G_F$ |
| 3 | 5.6358 | 1.7000 | 57.57 | 1.49108 | |
| 4 | 7.1059 | (variable) | | 1.00000 | |
| 5 | 10.9770 | 2.4000 | 57.57 | 1.49108 | |
| 6 | −15.1300 | 1.5000 | | 1.00000 | $G_R$ |
| 7 | −5.0303 | 1.8000 | 57.57 | 1.49108 | |
| 8* | −4.7420 | (variable) | | 1.00000 | |
| 9 | ∞ | 0.7000 | 58.80 | 1.52216 | $P_L$ |
| 10 | ∞ | 18.5000 | | 1.00000 | |
| 11 | ∞ | 0.2000 | | 1.00000 | s |
| 12 | ∞ | 2.9000 | 57.57 | 1.49108 | F |
| 13 | −12.1020 | 20.9900 | | 1.00000 | |
| 14* | 20.0640 | 4.8000 | 57.57 | 1.49108 | E |
| 15 | −29.5100 | 16.0000 | | 1.00000 | |
| 16 | E.P. | | | 1.00000 | |
| m | 0.4490 | 0.6097 | 0.8281 | | |
| d4 | 9.3593 | 4.8994 | 1.6154 | | |
| d8 | 0.4407 | 3.7246 | 8.1846 | | |

2nd surface (aspherical surface)

Standard radius of curvature: $R_2 = 4.4750$
Cone coefficient: $k = 0.71$
Aspherical surface coefficient
$C_2 = 0.0$
$C_4 = 1.52610 \times 10^{-4}$,    $C_6 = 3.47050 \times 10^{-6}$
$C_8 = 4.35960 \times 10^{-8}$,    $C_{10} = -8.99150 \times 10^{-9}$ 8th surface (aspherical surface)

Standard radius of curvature: $R_8 = -4.7420$
Cone coefficient: $k = 0.46$
Aspherical surface coefficient
$C_2 = 0.0$
$C_4 = 3.29640 \times 10^{-5}$,    $C_6 = 4.74550 \times 10^{-7}$
$C_8 = -5.27980 \times 10^{-8}$,    $C_{10} = -5.61980 \times 10^{-9}$ 14th surface (aspherical surface)

Standard radius of curvature: $R_{14} = 20.0640$
Cone coefficient: $k = -1.40$
Aspherical surface coefficient
$C_2 = 0.0$,    $C_4 = 0.0$,    $C_6 = 0.0$
$C_8 = -5.00000 \times 10^{-10}$,    $C_{10} = 0.0$ $\nu_1 = 40.6$,    $r_7/f_4 = 0.0912$,    $d_5/f_w = 0.234$
$f_1/f_w = -1.022$,    $n_1 = 1.536$,    $f_w = 10.25$
$S_2(0.6 \cdot r_2)/r_2 = 0.1953$
$S_8(0.25 \cdot r_8)/r_8 = 0.03146$

TABLE 3

(3rd Embodiment)

$x = -0.70$ Diopter    $m = 0.348x - 0.634x$
$2\omega = 55.0° - 29.5°$

| | r | d | $\nu$ | n | |
|---|---|---|---|---|---|
| 1 | −67.3990 | 1.2000 | 35.09 | 1.574100 | |
| 2* | 5.4810 | 1.7000 | | 1.000000 | $G_F$ |
| 3 | 6.2002 | 1.7000 | 57.57 | 1.491080 | |
| 4 | 11.0354 | (variable) | | 1.000000 | |
| 5 | 9.2570 | 2.5000 | 57.57 | 1.491080 | |
| 6 | −13.7350 | 0.3000 | | 1.000000 | $G_R$ |
| 7 | −4.8011 | 2.0000 | 57.57 | 1.491080 | |
| 8* | −4.8170 | (variable) | | 1.000000 | |
| 9 | ∞ | 0.7000 | 58.80 | 1.522160 | PL |
| 10 | ∞ | 5.0000 | | 1.000000 | |
| 11 | 10.6020 | 2.7000 | 57.57 | 1.491080 | s |
| 12 | ∞ | 0.2000 | | 1.000000 | F |
| 13 | ∞ | 25.8000 | | 1.000000 | |
| 14* | 19.0180 | 2.3000 | 57.57 | 1.491080 | E |
| 15 | −41.0030 | 16.0000 | | 1.000000 | |

TABLE 3-continued (3rd Embodiment)

$x = -0.70$ Diopter  $m = 0.348x - 0.634x$
$2\omega = 55.0° - 29.5°$

| 16 | E.P. | | 1.000000 | |
|---|---|---|---|---|
| | m | 0.34841 | 0.46996 | 0.63392 |
| | d4 | 8.36021 | 4.23632 | 1.17897 |
| | d8 | 10.48979 | 13.54707 | 17.67103 |

2nd surface (aspherical surface)

Standard radius of curvature: $R_2 = 5.4810$
Cone coefficient: $k = 0.8700$
Aspherical surface coefficient $C_2 = 0.0$,  $C_4 = 0.0$,  $C_6 = 0.0$
$C_8 = 1.4531 \times 10^{-7}$  $C_{10} = 0.0$ 8th surface (aspherical surface)

Standard radius of curvature: $R_8 = -4.8170$
Cone coefficient: $k = 0.3600$
Aspherical surface coefficient $C_2 = 0.0$,  $C_4 = 0.0$,  $C_6 = 0.0$
$C_8 = 2.60780 \times 10^{-8}$  $C_{10} = 0.0$ 14th surface (aspherical surface)

Standard radius of curvature: $R_{14} = 19.0180$
Cone coefficient: $k = -0.4600$
Aspherical surface coefficient $C_2 = 0.0$,  $C_4 = 0.0$,  $C_6 = 0.0$
$C_8 = -5.00000 \times 10^{-10}$  $C_{10} = 0.0$ $\nu_1 = 35.09$,  $r_7/f_4 = -0.0655$,  $d_5/f_w = 0.248$
$f_1/f_w = -0.873$,  $n_1 = 1.5741$,  $f_w = 10.052$
$S_2(0.6 \cdot r_2)/r_2 = 0.1972$
$S_8(0.25 \cdot r_8)/r_8 = 0.03143$ As described above, according to the present invention, there can be achieved a Keplerian finder which keeps a compact shape and yet has a wide angle and a high magnification change rate which could not be achieved before.

What is claimed is:

1. A Keplerian zoom finder optical system including an objective lens unit having a magnification changing function and having positive refractive power, and an eyepiece unit having positive refractive power for enlarging and observing therethrough a real image formed by said objective lens unit, said objective lens unit having, in succession from the object side, a forward group comprising a negative first lens and a positive meniscus-shaped second lens having its convex surface facing the object side, and having negative refractive power as a whole, and a rearward group comprising a biconvex positive third lens and a positive meniscus-shaped fourth lens having its convex surface facing the image side, and having positive refractive power as a whole, the spacing between said forward group and said rearward group being changed to thereby accomplish finder magnification change, said objective lens unit being designed to satisfy the following conditions:

$-0.12 < r_7/f_4 < -0.05$ $30 < \nu_1 < 45$, where
r7: the radius of curvature of that surface of the fourth lens in the rearward group which is adjacent to the object side,
f4: the focal length of the fourth lens in the rearward group,
ν1: the Abbe number of the first lens in the forward group.

2. A Keplerian zoom finder optical system including an objective lens unit having a magnification changing function and having positive refractive power, and an eyepiece unit having positive refractive power for enlarging and observing therethrough a real image formed by said objective lens unit, said objective lens unit having, in succession from the object side, a forward group comprising a negative first lens and a positive meniscus-shaped second lens having its convex surface facing the object side, and having negative refractive power as a whole, and a rearward group comprising a biconvex positive third lens and a positive meniscus-shaped fourth lens having its convex surface facing the image side, and having positive refractive power as a whole, the spacing between said forward group and said rearward group being changed to thereby accomplish finder magnification change, said objective lens unit being designed to satisfy the following conditions:

$-0.12 < r_7/f_4 < -0.05$ $0.2 < d_5/f_w < 0.27$, where
r7: the radius of curvature of that surface of the fourth lens in the rearward group,
f4: the focal length of the fourth lens in the rearward group,
d5: the on-axis thickness of the third lens in the rearward group,
$f_w$ : the combined focal length of the forward and rearward groups in the objective lens unit at the wide angle end.

3. A Keplerian zoom finder optical system including an objective lens unit having a magnification changing function and having positive refractive power, and an eyepiece unit having positive refractive power for enlarging and observing therethrough a real image formed by said objective lens unit, said objective lens unit having, in succession from the object side, a forward group comprising a negative first lens and a positive meniscus-shaped second lens having its convex surface facing the object side, and having negative refractive power as a whole, and a rearward group comprising a biconvex positive third lens and a positive meniscus-shaped fourth lens having its convex surface facing the image side, and having positive refractive power as a whole, the spacing between said forward group and said rearward group being changed to thereby accomplish finder magnification change, said objective lens unit being designed to satisfy the following conditions:

$-0.12 < r_7/f_4 < -0.05$ $1.53 < n_1 < 1.60$, where
r7: the radius of curvature of the surface of the fourth lens in the rearward group which is adjacent to the object side;
f4 the focal length of the fourth lens in the rearward group,
n1 : the refractive index of the first lens in the forward group.

4. A Keplerian zoom finder optical system including an objective lens unit having a magnification changing function and having positive refractive power, and an eyepiece unit having positive refractive power for enlarging and observing therethrough a real image formed by said objective lens unit, said objective lens unit having, in succession from the object side, a forward group comprising a negative first lens and a positive meniscus-shaped second lens having its convex surface facing the object side, and having negative refractive power as a whole, and a rearward group comprising a biconvex positive third lens and a positive meniscus-shaped fourth lens having its convex surface facing the image side, and having positive refractive power as a whole, the spacing between said forward group and said rearward group being changed to thereby accomplish finder magnification change, said objective lens unit being designed to satisfy the following conditions:

$$-0.12 < r_7/f_4 < -0.05$$

$$30 < \nu_1 < 45$$

$$0.2 < d_5/f_w < 0.27$$

$$-1.2 < f_1/f_w < -0.8,$$

where $r_7$ : the radius of curvature of that surface of the fourth lens in the rearward group which is adjacent to the object side, $f_4$ : the focal length of the fourth lens in the rearward group, $\nu_1$ : the Abbe number of the first lens in the forward group, $d_5$ : the on-axis thickness of the third lens in the rearward group, $f_w$ : the combined focal length of the forward and rearward groups in the objective lens unit at the wide angle end, $f_1$ : the focal length of the first lens in the forward group.

5. A Keplerian zoom finder optical system according to claim 4, wherein the first lens in the forward group is further designed to satisfy the following condition:

$$1.53 < n_1 < 1.60,$$

where $n_1$ : the refractive index of the first lens in the forward group.

6. A Keplerian zoom finder optical system according to claim 4, wherein said objective lens unit is further designed such that the combined focal length $f_w$ of the forward group and the rearward group at the wide angle end satisfies the following condition:

$$8.5 \text{ mm} < f_w < 11 \text{ mm}.$$

7. A Keplerian zoom finder optical system according to claim 4, wherein said first lens in said forward group and said fourth lens in said rearward group have those surfaces thereof which are adjacent to the image side formed into aspherical surfaces, and when the shape S(y) of the aspherical surfaces is expressed by the following general expression and the distance from the tangential plane on the vertexes of the aspherical surfaces at a height y in the vertical direction from the optical axis along the optical axis is indicated by S(y), $$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} \cdot y^{10},$$

where k : cone coefficient, $A_n$ : nth-order aspherical surface coefficient,

R : standard radius of curvature, and when the paraxial radius of curvature r of the aspherical surfaces is $$r = 1/(2 \cdot A_1/R),$$

said first lens and said fourth lens are designed such that the shapes of the aspherical surfaces thereof satisfy the following conditions:

$$0.188 \cdot r_2 < S_2(0.6 \cdot r_2) < 0.198 \cdot r_2$$

$$0.03 \cdot r_8 < S_8(0.25 \cdot r_8) < 0.0316 \cdot r_8,$$

where $S_2(y)$ : the aspherical shape of that surface of the first lens which is adjacent to the image side, $S_8(y)$ : the aspherical shape of that surface of the fourth lens which is adjacent to the image side, $r_2$ : the paraxial radius of curvature of the aspherical surface of the first lens which is adjacent to the image side, $r_8$ the paraxial radius of curvature of the aspherical surface of the fourth lens which is adjacent to the image side.

8. A Keplerian zoom finder optical system according to claim 1, which is designed in accordance with the following data:

| x = −1.00 Diopter 2ω = 64.0° − 25.8° | | | m = 0.377x − 0.928x | | |
|---|---|---|---|---|---|
| | r | d | ν | n | |
| 1 | 79.9325 | 1.3000 | 33.08 | 1.56440 | $G_F$ ⎤ |
| 2* | 5.5345 | 2.1000 | | 1.00000 | |
| 3 | 6.9037 | 2.3000 | 57.57 | 1.49108 | |
| 4 | 11.3510 | (variable) | | 1.00000 | ⎦ O |
| 5 | 12.6894 | 2.6000 | 57.57 | 1.49108 | $G_R$ ⎤ |
| 6 | −19.0105 | 1.6000 | | 1.00000 | |
| 7 | −5.2294 | 2.4000 | 57.57 | 1.49108 | |
| 8* | −5.0604 | (variable) | | 1.00000 | ⎦ |
| 9 | 23.0000 | 3.2000 | 57.57 | 1.49108 | F |
| 10 | −23.0000 | 0.6000 | | 1.00000 | |
| 11 | ∞ | 0.2000 | | 1.00000 | S |
| 12 | ∞ | 36.7500 | 56.05 | 1.56882 | P |
| 13 | ∞ | 0.5000 | | 1.00000 | |
| 14* | 20.9880 | 3.2000 | 57.57 | 1.49108 | E |
| 15 | −30.0120 | 15.0000 | | 1.00000 | |
| 16 | E.P. | | | 1.00000 | |
| m | 0.3773 | | 0.5935 | 0.9276 | |
| d4 | 14.6017 | | 6.1780 | 0.8823 | |
| d8 | 19.1186 | | 24.5082 | 32.8375 | |

2nd surface (aspherical surface)

Standard radius of curvature: $R_2 = 5.5345$
Cone coefficient: k = 0.76
Aspherical surface coefficient $C_2 = 0.0$
$C_4 = -1.76970 \times 10^{-5}$    $C_6 = 4.51780 \times 10^{-6}$
$C_8 = -1.85900 \times 10^{-7}$    $C_{10} = 1.55690 \times 10^{-10}$ 8th surface (aspherical surface)

Standard radius of curvature: $R_8 = -5.0604$
Cone coefficient: k = 0.44
Aspherical surface coefficient $C_2 = 0.0$
$C_4 = -2.02980 \times 10^{-5}$    $C_6 = -3.70760 \times 10^{-6}$
$C_8 = -3.08070 \times 10^{-8}$    $C_{10} = 7.84670 \times 10^{-10}$ 14th surface (aspherical surface)

Standard radius of curvature: $R_{14} = 20.9880$

-continued

| x = −1.00 Diopter | m = 0.377x − 0.928x |
| 2ω = 64.0° − 25.8° | |

Cone coefficient: k = −1.35
Aspherical surface coefficient

| $C_2 = 0.0$ | $C_4 = 0.0$ | $C_6 = 0.0$ |
| $C_8 = -3.00000 \times 10^{-10}$ | | $C_{10} = 0.0$ |

| $\nu_1 = 33.1$, | $r_7/f_4 = 0.0931$, | $d_5/f_w = 0.252$ |
| $f_1/f_w = -1.026$, | $n_1 = 1.563$, | $f_w = 10.33$ |
| $S_2(0.6 \cdot r_2)/r_2 = 0.1946$ | | |
| $S_8(0.25 \cdot r_8)/r_8 = 0.03148$ | | | where the numbers at the left end represent the surface numbers, r represents the radius of curvature, d represents the inter-surface spacing, n represents the refractive index for d-lines (λ=587.6 nm), ν represents the Abbe number, x represents the visibility (diopters), m represents the magnification, ω represents the angle of incidence (°), and E.P. represents the eye point,
  the aspherical surfaces are indicated by the mark * at the right of the surface numbers, and the shape of the aspherical surfaces is represented by the following polynominal:

$$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} \cdot y^{10},$$

where k is the cone coefficient, $A_n$ is the nth-order aspherical surface coefficient and R is the standard radius of curvature, and the paraxial radius of curvature r of the aspherical surfaces is indicated by $r = 1/(2 \cdot A_2 + 1/R)$.

9. A Keplerian zoom finder optical system according to claim 1, which is designed in accordance with the following data:

| x = −0.70 Diopter | | m = 0.449x − 0.828x | |
| 2ω = 55.5° − 30.2° | | | |

| | r | d | ν | n | |
|---|---|---|---|---|---|
| 1 | 23.8970 | 1.1000 | 40.57 | 1.53636 | |
| 2* | 4.4750 | 2.8000 | | 1.00000 | $G_F$ |
| 3 | 5.6358 | 1.7000 | 57.57 | 1.49108 | |
| 4 | 7.1059 | (variable) | | 1.00000 | |
| 5 | 10.9770 | 2.4000 | 57.57 | 1.49108 | O |
| 6 | −15.1300 | 1.5000 | | 1.00000 | $G_R$ |
| 7 | −5.0303 | 1.8000 | 57.57 | 1.49108 | |
| 8* | −4.7420 | (variable) | | 1.00000 | |
| 9 | ∞ | 0.7000 | 58.80 | 1.52216 | PL |
| 10 | ∞ | 18.5000 | | 1.00000 | |
| 11 | ∞ | 0.2000 | | 1.00000 | s |
| 12 | ∞ | 2.9000 | 57.57 | 1.49108 | F |
| 13 | −12.1020 | 20.9900 | | 1.00000 | |
| 14* | 20.0640 | 4.8000 | 57.57 | 1.49108 | E |
| 15 | −29.5100 | 16.0000 | | 1.00000 | |
| 16 | E.P. | | | 1.00000 | |
| m | 0.4490 | 0.6097 | 0.8281 | | |
| d4 | 9.3593 | 4.8994 | 1.6154 | | |
| d8 | 0.4407 | 3.7246 | 8.1846 | | |

2nd surface (aspherical surface)
Standard radius of curvature: $R_2 = 4.4750$
Cone coefficient: k = 0.71
Aspherical surface coefficient

| $C_2 = 0.0$ | | |
| $C_4 = 1.52610 \times 10^{-4}$ | $C_6 = 3.47050 \times 10^{-6}$ | |
| $C_8 = 4.35960 \times 10^{-8}$ | $C_{10} = -8.99150 \times 10^{-9}$ | |

8th surface (aspherical surface)

-continued

| x = −0.70 Diopter | m = 0.449x − 0.828x |
| 2ω = 55.5° − 30.2° | |

Standard radius of curvature: $R_8 = -4.7420$
Cone coefficient: k = 0.46
Aspherical surface coefficient

| $C_2 = 0.0$ | | |
| $C_4 = 3.29640 \times 10^{-5}$ | $C_6 = 4.74550 \times 10^{-7}$ |
| $C_8 = -5.27980 \times 10^{-8}$ | $C_{10} = -5.61980 \times 10^{-9}$ |

14th surface (aspherical surface)
Standard radius of curvature: $R_{14} = 20.0640$
Cone coefficient: k = −1.40
Aspherical surface coefficient

| $C_2 = 0.0$ | $C_4 = 0.0$ | $C_6 = 0.0$ |
| $C_8 = -5.00000 \times 10^{-10}$ | | $C_{10} = 0.0$ |

| $\nu_1 = 40.6$, | $r_7/f_4 = 0.0912$, | $d_5/f_w = 0.234$ |
| $f_1 = f_w = -1.022$, | $n_1 = 1.536$, | $f_w = 10.25$ |
| $S_2(0.6 \cdot r_2)/r_2 = 0.1953$ | | |
| $S_8(0.25 \cdot r_8)/r_8 = 0.03146$ | | | where the numbers at the left end represent the surface numbers, r represents the radius of curvature, d represents the inter-surface spacing, n represents the refractive index for d-lines (λ=587.6 nm), ν represents the Abbe number, x represents the visibility (diopters), m represents the magnification, ω represents the angle of incidence (°), and E.P. represents the eye point,
  the aspherical surfaces are indicated by the mark * at the right of the surface numbers, and the shape of the aspherical surfaces is represented by the following polynominal:

$$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} \cdot y^{10},$$

where k is the cone coefficient, $A_n$ is the nth-order aspherical surface coefficient, and R is the standard radius of curvature, and the paraxial radius of curvature r of the aspherical surfaces is indicated by $r = 1/(2 \cdot A_2 + 1/R)$.

10. A Keplerian zoom finder optical system according to claim 1, which is designed in accordance with the following data:

| x = −0.70 Diopter | | m = 0.348x − 0.634x | |
| 2ω = 55.0° − 29.5° | | | |

| | r | d | ν | n | |
|---|---|---|---|---|---|
| 1 | −67.3990 | 1.2000 | 35.09 | 1.574100 | |
| 2* | 5.4810 | 1.7000 | | 1.000000 | $G_F$ |
| 3 | 6.2002 | 1.7000 | 57.57 | 1.491080 | |
| 4 | 11.0354 | (variable) | | 1.000000 | O |
| 5 | 9.2570 | 2.5000 | 57.57 | 1.491080 | |
| 6 | −13.7350 | 0.3000 | | 1.000000 | $G_R$ |
| 7 | −4.8011 | 2.0000 | 57.57 | 1.491080 | |
| 8* | −4.8170 | (variable) | | 1.000000 | |
| 9 | ∞ | 0.7000 | 58.80 | 1.522160 | PL |
| 10 | ∞ | 5.0000 | | 1.000000 | |
| 11 | 10.6020 | 2.7000 | 57.57 | 1.491080 | s |
| 12 | ∞ | 0.2000 | | 1.000000 | F |
| 13 | ∞ | 25.8000 | | 1.000000 | |
| 14 | 19.0180 | 2.3000 | 57.57 | 1.491080 | E |
| 15 | −41.0030 | 16.0000 | | 1.000000 | |
| 16 | E.P. | | | 1.000000 | |
| m | 0.34841 | 0.46996 | 0.63392 | | |
| d4 | 8.36021 | 4.23632 | 1.17897 | | |
| d8 | 10.48979 | 13.54707 | 17.67103 | | |

-continued

| x = −0.70 Diopter | m = 0.348x − 0.634x |
| 2ω = 55.0° − 29.5° | |

2nd surface (aspherical surface)
Standard radius of curvature: $R_2 = 5.4810$
Cone coefficient: $k = 0.8700$
Aspherical surface coefficient

| $C_2 = 0.0$ | $C_4 = 0.0$ | $C_6 = 0.0$ |
| $C_8 = 1.4531 \times 10^{-7}$ | | $C_{10} = 0.0$ |

8th surface (aspherical surface)
Standard radius of curvature: $R_8 = -4.8170$
Cone coefficient: $k = 0.3600$
Aspherical surface coefficient

| $C_2 = 0.0$ | $C_4 = 0.0$ | $C_6 = 0.0$ |
| $C_8 = 2.60780 \times 10^{-8}$ | | $C_{10} = 0.0$ |

14th surface (aspherical surface)
Standard radius of curvature: $R_{14} = 19.0180$
Cone coefficient: $k = -0.4600$
Aspherical surface coefficient

| $C_2 = 0.0$ | $C_4 = 0.0$ | $C_6 = 0.0$ |
| $C_8 = -5.00000 \times 10^{-10}$ | | $C_{10} = 0.0$ |

| $\nu_1 = 35.09$ | $r_7/f_4 = -0.0655$ | $d_5/f_w = 0.248$ |
| $f_1/f_w = -0.873$ | $n_1 = 1.5741$ | $f_w = 10.052$ |
| $S_2(0.6 \cdot r_2)/r_2 = 0.1972$ | | |
| $S_8(0.25 \cdot r_8)/r_8 = 0.03143$ | | | where the numbers at the left end represents the surface numbers, r represents the radius of curvature, d represents the inter-surface spacing, n represents the refractive index for d-lines (λ=587.6 nm), $\nu$ represents the Abbe number, x represents the visibility (diopters), m represents the magnification, ω represents the angle of incidence (°), and E.P. represents the eye point, the aspherical surfaces are indicated by the mark * at the right of the surface numbers, and the shape of the aspherical surfaces is represented by the following polynominal:

$$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} \cdot y^{10},$$

where k is the cone coefficient, $A_n$ is the nth-order aspherical surface coefficient, and R is the standard radius of curvature, and the paraxial radius of curvature r of the aspherical surfaces is indicated by $r = 1/(2 \cdot A_2 + 1/R)$.

11. A Keplerian zoom finder optical system according to claim 2, which is designed in accordance with the following data:

| x = −1.00 Diopter, | | m = 0.377x − 0.928x | |
| 2ω = 64.0° − 25.8° | | | |

| | r | d | $\nu$ | n | |
|---|---|---|---|---|---|
| 1 | 79.9325 | 1.3000 | 33.08 | 1.56440 | |
| 2* | 5.5345 | 2.1000 | | 1.00000 | |
| 3 | 6.9037 | 2.3000 | 57.57 | 1.49108 | $G_F$ |
| 4 | 11.3510 | (variable) | | 1.00000 | |
| 5 | 12.6894 | 2.6000 | 57.57 | 1.49108 | |
| 6 | −19.0105 | 1.6000 | | 1.00000 | |
| 7 | −5.2294 | 2.4000 | 57.57 | 1.49108 | $G_R$ |
| 8* | −5.0604 | (variable) | | 1.00000 | |
| 9 | 23.0000 | 3.2000 | 57.57 | 1.49108 | F |
| 10 | −23.0000 | 0.6000 | | 1.00000 | |
| 11 | ∞ | 0.2000 | | 1.00000 | S |
| 12 | ∞ | 36.7500 | 56.05 | 1.56882 | P |
| 13 | ∞ | 0.5000 | | 1.00000 | |
| 14* | 20.9880 | 3.2000 | 57.57 | 1.49108 | |

-continued

| x = −1.00 Diopter, | | m = 0.377x − 0.928x | |
| 2ω = 64.0° − 25.8° | | | |

| 15 | −30.0120 | 15.0000 | | 1.00000 | E |
| 16 | E.P. | | | 1.00000 | |

| m | 0.3773 | 0.5935 | 0.9276 |
| d4 | 14.6017 | 6.1780 | 0.8823 |
| d8 | 19.1186 | 24.5082 | 32.8375 |

2nd surface (aspherical surface)
Standard radius of curvature: $R_2 = 5.5345$
Cone coefficient: $k = 0.76$
Aspherical surface coefficient

| $C_2 = 0.0$ | |
| $C_4 = -1.76970 \times 10^{-5}$ | $C_6 = 4.51780 \times 10^{-6}$ |
| $C_8 = -1.85900 \times 10^{-7}$ | $C_{10} = 1.55690 \times 10^{-10}$ |

8th surface (aspherical surface)
Standard radius of curvature: $R_8 = -5.0604$
Cone coefficient: $k = 0.44$
Aspherical surface coefficient

| $C_2 = 0.0$ | |
| $C_4 = -2.02980 \times 10^{-5}$ | $C_6 = -3.70760 \times 10^{-6}$ |
| $C_8 = -3.08070 \times 10^{-8}$ | $C_{10} = 7.84670 \times 10^{-10}$ |

14th surface (aspherical surface)
Standard radius of curvature: $R_{14} = 20.9880$
Cone coefficient: $k = -1.35$
Aspherical surface coefficient

| $C_2 = 0.0$ | $C_4 = 0.0$ | $C_6 = 0.0$ |
| $C_8 = -3.00000 \times 10^{-10}$ | | $C_{10} = 0.0$ |

| $\nu_1 = 33.1,$ | $r_7/f_4 = 0.0931,$ | $d_5/f_w = 0.252$ |
| $f_1/f_w = -1.026,$ | $n_1 = 1.563,$ | $f_w = 10.33$ |
| $S_2(0.6 \cdot r_2)/r_2 = 0.1946$ | | |
| $S_8(0.25 \cdot r_8)/r_8 = 0.03148$ | | | where the numbers at the left end represent the surface numbers, r represents the radius of curvature, d represents the inter-surface spacing, n represents the refractive index for d-lines (λ=587.6 nm), $\nu$ represents the Abbe number, x represents the visibility (diopters), m represents the magnification, ω represents the angle of incidence (°), and E.P. represents the eye point, the aspherical surfaces are indicated by the mark * at the right of the surface numbers, and the shape of the aspherical surfaces is represented by the following polynominal:

$$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} \cdot y^{10},$$

where k is the cone coefficient, $A_n$ is the nth-order aspherical surface coefficient, and R is the standard radius of curvature, and the paraxial radius of curvature r of the aspherical surfaces is indicated by $r = 1/(2 \cdot A_2 + 1/R)$.

12. A Keplerian zoom finder optical system according to claim 2, which is designed in accordance with the following data:

| x = −0.70 Diopter | m = 0.449x − 0.828x | | |
| 2ω = 55.5° − 30.2° | | | |

| | r | d | $\nu$ | n | |
|---|---|---|---|---|---|
| 1 | 23.8970 | 1.1000 | 40.57 | 1.53636 | |
| 2* | 4.4750 | 2.8000 | | 1.00000 | $G_F$ |
| 3 | 5.6358 | 1.7000 | 57.57 | 1.49108 | |
| 4 | 7.1059 | (variable) | | 1.00000 | |
| 5 | 10.9770 | 2.4000 | 57.57 | 1.49108 | |
| 6 | −15.1300 | 1.5000 | | 1.00000 | $G_R$ |
| 7 | −5.0303 | 1.8000 | 57.57 | 1.49108 | |

-continued

| | | | | | |
|---|---|---|---|---|---|
| 8* | −4.7420 | (variable) | 1.00000 | | |
| 9 | ∞ | 0.7000 | 58.80 | 1.52216 | ⎤ |
| 10 | ∞ | 18.5000 | | 1.00000 | ⎦ PL |
| 11 | ∞ | 0.2000 | | 1.00000 | ] s |
| 12 | ∞ | 2.9000 | 57.57 | 1.49108 | ⎤ |
| 13 | −12.1020 | 20.9900 | | 1.00000 | ⎦ F |
| 14* | 20.0640 | 4.8000 | 57.57 | 1.49108 | ⎤ |
| 15 | −29.5100 | 16.0000 | | 1.00000 | ⎦ E |
| 16 | E.P. | | | 1.00000 | |

| | | | |
|---|---|---|---|
| m | 0.4490 | 0.6097 | 0.8281 |
| d4 | 9.3593 | 4.8994 | 1.6154 |
| d8 | 0.4407 | 3.7246 | 8.1846 |

2nd surface (aspherical surface)
Standard radius of curvature: $R_2 = 4.4750$
Cone coefficient: $k = 0.71$
Aspherical surface coefficient
$C_2 = 0.0$
$C_4 = 1.52610 \times 10^{-4}$  $C_6 = 3.47050 \times 10^{-6}$
$C_8 = 4.35960 \times 10^{-8}$  $C_{10} = -8.99150 \times 10^{-9}$
8th surface (aspherical surface)
Standard radius of curvature: $R_8 = -4.7420$
Cone coefficient: $k = 0.46$
Aspherical surface coefficient
$C_2 = 0.0$
$C_4 = 3.29640 \times 10^{-5}$  $C_6 = 4.74550 \times 10^{-7}$
$C_8 = -5.27980 \times 10^{-8}$  $C_{10} = -5.61980 \times 10^{-9}$
14th surface (aspherical surface)
Standard radius of curvature: $R_4 = 20.0640$
Cone coefficient: $k = 1.40$
Aspherical surface coefficient
$C_2 = 0.0$  $C_4 = 0.0$  $C_6 = 0.0$
$C_8 = -5.00000 \times 10^{-10}$  $C_{10} = 0.0$ $\nu_1 = 40.6$, $r_7/f_4 = 0.0912$, $d_5/f_w = 0.234$
$f_1/f_w = -1.022$, $n_1 = 1.536$, $f_w = 10.25$
$S_2(0.6 \cdot r_2)/r_2 = 0.1953$
$S_8(0.25 \cdot r_8)/r_8 = 0.03146$ where the numbers at the left end represent the surface numbers, r represents the radius of curvature, d represents the inter-surface spacing, n represents the refractive index for d-lines (λ=587.6 nm), ν represents the Abbe number, x represents the visibility (diopters), m represents the magnification, ω represents the angle of incidence (°), and E.P. represent the eye point, the aspherical surfaces are indicated by the mark, * at the right of the surface numbers, and the shape of the aspherical surfaces is represented by the following polynominal:

$$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} \cdot y^{10},$$

where K is the cone coefficient, $A_n$ is the nth-order aspherical surface coefficient, and R is the standard radius of curvature, and the paraxial radius of curvature r of the aspherical surfaces is indicated by $r = 1/(2 \cdot A_2 + 1/R)$.

13. A Keplerian zoom finder optical system according to claim 2, which is designed in accordance with the following data:

$x = -0.70$ Diopter  $m = 0.348x - 0.634x$
$2\omega = 55.0° - 29.5°$

| | r | d | ν | n |
|---|---|---|---|---|
| 1 | −67.3990 | 1.2000 | 35.09 | 1.574100 |
| 2* | 5.4810 | 1.7000 | | 1.000000 |

-continued

| | | | | | |
|---|---|---|---|---|---|
| 3 | 6.2002 | 1.7000 | 57.57 | 1.491080 | ⎤ $G_F$ |
| 4 | 11.0354 | (variable) | | 1.000000 | ⎦ |
| 5 | 9.2570 | 2.5000 | 57.57 | 1.491080 | ⎤ O |
| 6 | −13.7350 | 0.3000 | | 1.000000 | $G_R$ |
| 7 | −4.8011 | 2.0000 | 57.57 | 1.491080 | |
| 8* | −4.8170 | (variable) | | 1.000000 | ⎦ |
| 9 | ∞ | 0.7000 | 58.80 | 1.522160 | ⎤ PL |
| 10 | ∞ | 5.0000 | | 1.000000 | ⎦ |
| 11 | 10.6020 | 2.7000 | 57.57 | 1.491080 | ] s |
| 12 | ∞ | 2.0000 | | 1.000000 | ⎤ F |
| 13 | ∞ | 25.8000 | | 1.000000 | ⎦ |
| 14* | 19.0810 | 2.3000 | 57.57 | 1.491080 | ⎤ E |
| 15 | −41.0030 | 16.0000 | | 1.000000 | ⎦ |
| 16 | E.P. | | | 1.000000 | |

| | | | |
|---|---|---|---|
| m | 0.34841 | 0.46996 | 0.63392 |
| d4 | 8.36021 | 4.23632 | 1.17897 |
| d8 | 10.48979 | 13.54707 | 17.67103 |

2nd surface (aspherical surface)
Standard radius of curvature: $R_2 = 5.4810$
Cone coefficient: $k = 0.8700$
Aspherical surface coefficient
$C_2 = 0.0$  $C_4 = 0.0$  $C_6 = 0.0$
$C_8 = 1.4531 \times 10^{-7}$  $C_{10} = 0.0$
8th surface (aspherical surface)
Standard radius of curvature: $R_8 = -4.8170$
Cone coefficient: $k = 0.3600$
Aspherical surface coefficient
$C_2 = 0.0$  $C_4 = 0.0$  $C_6 = 0.0$
$C_8 = 2.60780 \times 10^{-8}$  $C_{10} = 0.0$
14th surface (aspherical surface)
Standard radius of curvature: $R_{14} = 19.0180$
Cone coefficient: $k = -0.4600$
Aspherical surface coefficient
$C_2 = 0.0$  $C_4 = 0.0$  $C_6 = 0.0$
$C_8 = -5.00000 \times 10^{-10}$  $C_{10} = 0.0$ $\nu_1 = 35.09$, $r_7/f_4 = -0.0655$, $d_5/f_w = 0.248$
$f_1/f_w = -0.873$, $n_1 = 1.5741$, $f_w = 10.052$
$S_2(0.6 \cdot r_2)/r_2 = 0.1972$
$S_8(0.25 \cdot r_8)/r_8 = 0.03143$ where the numbers at the left end represent the surface numbers, r represents the radius of curvature, d represents the inter-surface spacing, n represents the refractive index for d-lines (λ=587.6 nm), ν represents the Abbe number, x represents the visibility (diopters), m represents the magnification, ω represents the angle of incidence (°), the E.P. represents the eye point, the aspherical surfaces are indicated by the mark * at the right of the surface numbers, and the shape of the aspherical surfaces is represented by the following polynominal:

$$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} \cdot y^{10},$$

where k is the cone coefficient, $A_n$ is the nth-order aspherical surface coefficient, and R is the standard radius of curvature, and the paraxial radius of curvature r of the aspherical surfaces is indicated by $r = 1/(2 \cdot A_2 + 1/R)$.

14. A Keplerian zoom finder optical system according to claim 3, which is designed in accordance with the following data:

$x = -1.00$ Diopter  $m = 0.377x - 0.928x$
$2\omega = 64.0° - 25.8°$

-continued

| | r | d | $\nu$ | n | | |
|---|---|---|---|---|---|---|
| 1 | 79.9325 | 1.3000 | 33.08 | 1.56440 | ⎤ | |
| 2* | 5.5345 | 2.1000 | | 1.00000 | | $G_F$ |
| 3 | 6.9037 | 2.3000 | 57.57 | 1.49108 | | |
| 4 | 11.3510 | (variable) | | 1.00000 | ⎦ | |
| 5 | 12.6894 | 2.6000 | 57.57 | 1.49108 | ⎤ | O |
| 6 | −19.0105 | 1.6000 | | 1.00000 | | $G_R$ |
| 7 | −5.2294 | 2.4000 | 57.57 | 1.49108 | | |
| 8* | −5.0604 | (variable) | | 1.00000 | ⎦ | |
| 9 | 23.0000 | 3.2000 | 57.57 | 1.49108 | ⎤ | F |
| 10 | −23.0000 | 0.6000 | | 1.00000 | ⎦ | |
| 11 | ∞ | 0.2000 | | 1.00000 | ] | s |
| 12 | ∞ | 36.7500 | 56.05 | 1.56882 | ] | P |
| 13 | ∞ | 0.5000 | | 1.00000 | | |
| 14* | 20.9880 | 3.2000 | 57.57 | 1.49108 | ⎤ | E |
| 15 | −30.0120 | 15.0000 | | 1.00000 | ⎦ | |
| 16 | E.P. | | | 1.00000 | | |

| | | | |
|---|---|---|---|
| m | 0.3773 | 0.5935 | 0.9276 |
| d4 | 14.6017 | 6.1780 | 0.8823 |
| d8 | 19.1186 | 24.5082 | 32.8375 |

2nd surface (aspherical surface)
Standard radius of curvature: $R_2 = 5.5345$
Cone coefficient: $k = 0.76$
Aspherical surface coefficient
$C_2 = 0.0$
$C_4 = -1.76970 \times 10^{-5}$   $C_6 = 4.51780 \times 10^{-6}$
$C_8 = -1.85900 \times 10^{-7}$   $C_{10} = 1.55690 \times 10^{-10}$
8th surface (aspherical surface)
Standard radius of curvature: $R_8 = -5.0604$
Cone coefficient: $k = 0.44$
Aspherical surface coefficient
$C_2 = 0.0$
$C_4 = -2.02980 \times 10^{-5}$   $C_6 = -3.70760 \times 10^{-6}$
$C_8 = -3.08070 \times 10^{-8}$   $C_{10} = 7.84670 \times 10^{-10}$
14th surface (aspherical surface)
Standard radius of curvature: $R_{14} = 20.9880$
Cone coefficient: $k = -1.35$
Aspherical surface coefficient
$C_2 = 0.0$      $C_4 = 0.0$      $C_6 = 0.0$
$C_8 = -3.000000 \times 10^{-10}$   $C_{10} = 0.0$ $\nu_1 = 33.1$, $r_7/f_4 = 0.0931$, $d_5/f_w = 0.252$
$f_1/f_w = -1.026$, $n_1 = 1.563$, $f_w = 10.33$
$S_2(0.6 \cdot r_2)/r_2 = 0.1946$
$S_8(0.25 \cdot r_8)/r_8 = 0.03148$ where the numbers at the left end represent the surface numbers, r represents the radius of curvature, d represents the inter-surface spacing, n represents the refractive index for d-lines ($\lambda = 587.6$ nm), $\nu$ represents the Abbe number, x represents the visibility (diopters), m represents the magnification, $\omega$ represents the angle of incidence (°), and E.P. represents the eye point, the aspherical surfaces are indicated by the mark * at the right of the surface numbers, and the shape of the aspherical surfaces is represented by the following polynominal:

$$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} \cdot y^{10},$$

where k is the cone coefficient, $A_n$ is the nth-order aspherical surface coefficient, and R is the standard radius of curvature, and the paraxial radius of curvature r of the aspherical surfaces is indicated by $r = 1/(2 \cdot A_2 + 1/R)$.

15. A Keplerian zoom finder optical system according to claim 3, which is designed in accordance with the following data:

$x = -0.70$ Diopter  $m = 0.449x - 0.828x$
$2\omega = 55.5° - 30.2°$

| | r | d | $\nu$ | n | | |
|---|---|---|---|---|---|---|
| 1 | 23.8970 | 1.1000 | 40.57 | 1.53636 | ⎤ | |
| 2* | 4.4750 | 2.8000 | | 1.00000 | | $G_F$ |
| 3 | 5.6358 | 1.7000 | 57.57 | 1.49108 | | |
| 4 | 7.1059 | (variable) | | 1.00000 | ⎦ | |
| 5 | 10.9770 | 2.4000 | 57.57 | 1.49108 | ⎤ | O |
| 6 | −15.1300 | 1.5000 | | 1.00000 | | $G_R$ |
| 7 | −5.0303 | 1.8000 | 57.57 | 1.49108 | | |
| 8* | −4.7420 | (variable) | | 1.00000 | ⎦ | |
| 9 | ∞ | 0.7000 | 58.80 | 1.52216 | ⎤ | PL |
| 10 | ∞ | 18.5000 | | 1.00000 | ⎦ | |
| 11 | ∞ | 0.2000 | | 1.00000 | ] | s |
| 12 | ∞ | 2.9000 | 57.57 | 1.49108 | ⎤ | F |
| 13 | −12.1020 | 20.9900 | | 1.00000 | ⎦ | |
| 14* | 20.0640 | 4.8000 | 57.57 | 1.49108 | ⎤ | E |
| 15 | −29.5100 | 16.0000 | | 1.00000 | ⎦ | |
| 16 | E.P. | | | 1.00000 | | |

| | | | |
|---|---|---|---|
| m | 0.4490 | 0.6097 | 0.8281 |
| d4 | 9.3593 | 4.8994 | 1.6154 |
| d8 | 0.4407 | 3.7246 | 8.1846 |

2nd surface (aspherical surface)
Standard radius of curvature: $R_2 = 4.4750$
Cone coefficient: $k = 0.71$
Aspherical surface coefficient
$C_2 = 0.0$
$C_4 = 1.52610 \times 10^{-4}$   $C_6 = 3.47050 \times 10^{-6}$
$C_8 = 4.35960 \times 10^{-8}$   $C_{10} = -8.99150 \times 10^{-9}$
8th surface (aspherical surface)
Standard radius of curvature: $R_8 = -4.7420$
Cone coefficient: $k = 0.46$
Aspherical surface coefficient
$C_2 = 0.0$
$C_4 = 3.29640 \times 10^{-5}$   $C_6 = 4.74550 \times 10^{-7}$
$C_8 = -5.27980 \times 10^{-8}$   $C_{10} = -5.61980 \times 10^{-9}$
14th surface (aspherical surface)
Standard radius of curvature: $R_{14} = 20.0640$
Cone coefficient: $k = -1.40$
Aspherical surface coefficient
$C_2 = 0.0$      $C_4 = 0.0$      $C_6 = 0.0$
$C_8 = -5.00000 \times 10^{-10}$   $C_{10} = 0.0$ $\nu_1 = 40.6$, $r_7/f_4 = -0.0912$, $d_5/f_w = 0.234$
$f_1/f_w = -1.022$, $n_1 = 1.536$, $f_w = 10.25$
$S_2(0.6 \cdot r_2)/r_2 = 0.1953$
$S_8(0.25 \cdot r_8)/r_8 = 0.03146$ where the numbers at the left end represent the surface numbers, r represents the radius of curvature, d represents the inter-surface spacing, n represents the refractive index for d-lines ($\lambda = 587.6$ nm), $\nu$ represents the Abbe number, x represents the visibility (diopters), m represents the magnification, $\omega$ represents the angle of incidence (°), and E.P. represents the eye point, the aspherical surfaces are indicated by the mark * at the right of the surface numbers, and the shape of the aspherical surfaces is represented by the following polynominal:

$$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} \cdot y^{10},$$

where k is the cone coefficient, $A_n$ is the nth-order aspherical surface coefficient, and R is the standard radius of curvature, and the paraxial radius of curvature r of the aspherical surfaces is indicated by $r = 1/(2 \cdot A_2 + a/R)$.

16. A Keplerian zoom finder optical system according to claim 3, which is designed in accordance with the following data:

x = −0.70 Diopter  m = 0.348x − 0.634x
2ω = 55.5° − 29.5°

| | r | d | ν | n | |
|---|---|---|---|---|---|
| 1 | −67.3990 | 1.2000 | 35.09 | 1.574100 | |
| 2* | 5.4810 | 1.7000 | | 1.000000 | |
| 3 | 6.2002 | 1.7000 | 57.57 | 1.491080 | $G_F$ |
| 4 | 11.0354 | (variable) | | 1.000000 | |
| 5 | 9.2570 | 2.5000 | 57.57 | 1.491080 | O |
| 6 | −13.7350 | 0.3000 | | 1.000000 | $G_R$ |
| 7 | −4.8011 | 2.0000 | 57.57 | 1.491080 | |
| 8* | −4.8170 | (variable) | | 1.000000 | |
| 9 | ∞ | 0.7000 | 58.80 | 1.522160 | PL |
| 10 | ∞ | 5.0000 | | 1.000000 | |
| 11 | 10.6020 | 2.7000 | 57.57 | 1.491080 | s |
| 12 | ∞ | 0.2000 | | 1.000000 | F |
| 13 | ∞ | 25.8000 | | 1.000000 | |
| 14* | 19.0180 | 2.3000 | 57.57 | 1.491080 | E |
| 15 | −41.0030 | 16.0000 | | 1.000000 | |
| 16 | E.P. | | | 1.000000 | |

| m | 0.34841 | 0.46996 | 0.63392 |
|---|---|---|---|
| d4 | 8.36021 | 4.23632 | 1.17897 |
| d8 | 10.48979 | 13.54707 | 17.67103 |

2nd surface (aspherical surface)
Standard radius of curvature: $R_2$ = 5.4810
Cone coefficient: k = 0.8700
Aspherical surface coefficient
$C_2 = 0.0$   $C_4 = 0.0$   $C_6 = 0.0$
$C_8 = 1.4531 \times 10^{-7}$   $C_{10} = 0.0$
8th surface (aspherical surface)
Standard radius of curvature: $R_8$ = −4.8170
Cone coefficient: k = 0.3600
Aspherical surface coefficient
$C_2 = 0.0$   $C_4 = 0.0$   $C_6 = 0.0$
$C_8 = 2.60780 \times 10^{-8}$   $C_{10} = 0.0$
8th surface (aspherical surface)
Standard radius of curvature: $R_{14}$ = 19.0180
Cone coefficient: k = −0.4600
Aspherical surface coefficient
$C_2 = 0.0$   $C_4 = 0.0$   $C_6 = 0.0$
$C_8 = -5.0000 \times 10^{-10}$   $C_{10} = 0.0$ $\nu_1 = 35.09$, $r_7/f_4 = -0.0655$, $d_5/f_w = 0.248$
$f_1/f_w = -0.873$, $n_1 = 1.5741$, $f_w = 10.052$
$S_2(0.6 \cdot r_2)/r_2 = 0.1972$
$S_8(0.25 \cdot r_8)/r_8 = 0.03143$ where the numbers at the left end represent the surface numbers, r represents the radius of curvature, d represents the inter-surface spacing, n represents the refractive index for d-lines (λ=587.6 nm), ν represents the Abbe number, x represents the visibility (diopters), m represents the magnification, ω represents the angle of incidence (°), and E.P. represents the eye point, the aspherical surfaces are indicated by the mark * at the right of the surface numbers, and the shape of the aspherical surfaces is represented by the following polynominal:

$$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} \cdot y^{10},$$

where k is the cone coefficient, $A_n$ is the nth-order aspherical surface coefficient and R is the standard radius of curvature, and the paraxial radius of curvature r of the aspherical surfaces is indicated by $r = 1/(2 \cdot A_2 + 1/R)$.

17. A Keplerian zoom finder optical system according to claim 4, which is designed in accordance with the following data:

x = −1.00 Diopter  m = 0.377x − 0.928x
2ω = 64.0° − 25.8°

| | r | d | ν | n | |
|---|---|---|---|---|---|
| 1 | 79.9325 | 1.3000 | 33.08 | 1.56440 | |
| 2* | 5.5345 | 2.1000 | | 1.00000 | $G_F$ |
| 3 | 6.9037 | 2.3000 | 57.57 | 1.49108 | |
| 4 | 11.3510 | (variable) | | 1.00000 | |
| 5 | 12.6894 | 2.6000 | 57.57 | 1.49108 | O |
| 6 | −19.0105 | 1.6000 | | 1.00000 | $G_R$ |
| 7 | −5.2294 | 2.4000 | 57.57 | 1.49108 | |
| 8* | −5.0604 | (variable) | | 1.00000 | |
| 9 | 23.0000 | 3.2000 | 57.79 | 1.49108 | F |
| 10 | −23.0000 | 0.6000 | | 1.00000 | |
| 11 | ∞ | 0.2000 | | 1.00000 | s |
| 12 | ∞ | 36.7500 | 56.05 | 1.56882 | P |
| 13 | ∞ | 0.5000 | | 1.00000 | |
| 14* | 20.9880 | 3.2000 | 57.57 | 1.49108 | E |
| 15 | −30.0120 | 15.0000 | | 1.00000 | |
| 16 | E.P. | | | 1.00000 | |

| m | 0.3773 | 0.5935 | 0.9276 |
|---|---|---|---|
| d4 | 14.6017 | 6.1780 | 0.8823 |
| d8 | 19.1186 | 24.5082 | 32.8375 |

2nd surface (aspherical surface)
Standard radius of curvature: $R_2$ = 5.5345
Cone coefficient: k = 0.76
Aspherical surface coefficient
$C_2 = 0.0$
$C_4 = -1.76970 \times 10^{-5}$   $C_6 = 4.51780 \times 10^{-6}$
$C_8 = -1.85900 \times 10^{-7}$   $C_{10} = 1.55690 \times 10^{-10}$
8th surface (aspherical surface)
Standard radius of curvature: $R_8$ = −5.0604
Cone coefficient: k = 0.44
Aspherical surface coefficient
$C_2 = 0.0$
$C_4 = -2.02980 \times 10^{-5}$   $C_6 = -3.70760 \times 10^{-6}$
$C_8 = -3.08070 \times 10^{-8}$   $C_{10} = 7.84670 \times 10^{-9}$
14th surface (aspherical surface)
Standard radius of curvature: $R_{14}$ = 20.9880
Cone coefficient: k = −1.35
Aspherical surface coefficient
$C_2 = 0.0$   $C_4 = 0.0$   $C_6 = 0.0$
$C_8 = -3.00000 \times 10^{-10}$   $C_{10} = 0.0$ $\nu_1 = 33.1$, $r_7/f_4 = 0.0931$, $d_5/f_w = 0.252$
$f_1/f_w = -1.026$, $n_1 = 1.563$, $f_w = 10.33$
$S_2(0.6 \cdot r_2)/r_2 = 0.1946$
$S_8(0.25 \cdot r_8)/r_8 = 0.03148$ where the numbers at the left end represent the surface numbers, r represents the radius of curvature, d represents the inter-surface spacing, n represents the refractive index for d-lines (λ=587.6 nm), ν represents the Abbe number, x represents the visibility (diopters), m represents the magnification, ω represents the angle of incidence (°), and E.P. represents the eye point, the aspherical surfaces are indicated by the mark * at the right of the surface numbers, and the shape of the aspherical surfaces is represented by the following polynominal:

$$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} \cdot y^{10},$$

where k is the cone coefficient, $A_n$ is the nth-order aspherical surface coefficient, and R is the standard radius of curvature, and the paraxial radius of curvature r of the aspherical surfaces is indicated by $r = 1/(2 \cdot A_2 + 1/R)$.

18. A Keplerian zoom finder optical system according to claim 4, which is designed in accordance with the following data:

| | | | | |
|---|---|---|---|---|
| \multicolumn{5}{l}{$x = -0.70$ Diopter $m = 0.449x - 0.828x$} |
| \multicolumn{5}{l}{$2\omega = 55.5° - 30.2°$} |
| | r | d | v | n |
| 1 | 23.8970 | 1.1000 | 40.57 | 1.53636 |
| 2* | 4.4750 | 2.8000 | | 1.00000 |
| 3 | 5.6358 | 1.7000 | 57.57 | 1.49108 |
| 4 | 7.1059 | (variable) | | 1.00000 |
| 5 | 10.9770 | 2.4000 | 57.57 | 1.49108 |
| 6 | −15.1300 | 1.5000 | | 1.00000 |
| 7 | −5.0303 | 1.8000 | 57.57 | 1.49108 |
| 8* | −4.7420 | (variable) | | 1.00000 |
| 9 | ∞ | 0.7000 | 58.80 | 1.52216 |
| 10 | ∞ | 18.5000 | | 1.00000 |
| 11 | ∞ | 0.2000 | | 1.00000 |
| 12 | ∞ | 2.9000 | 57.57 | 1.49108 |
| 13 | −12.1020 | 20.9900 | | 1.00000 |
| 14* | 20.0640 | 4.8000 | 57.57 | 1.49108 |
| 15 | −29.5100 | 16.0000 | | 1.00000 |
| 16 | E.P. | | | 1.00000 |
| m | 0.4490 | | 0.6097 | 0.8281 |
| d4 | 9.3593 | | 4.8994 | 1.6154 |
| d8 | 0.4407 | | 3.7246 | 8.1846 |

Groups: $G_F$ (rows 1–4), $G_R$ (rows 5–8), PL (rows 9–10), s (row 11), F (rows 12–13), E (rows 14–15); O indicates the overall objective.

2nd surface (aspherical surface)
Standard radius of curvature: $R_2 = 4.4750$
Cone coefficient: $k = 0.71$
Aspherical surface coefficient
$C_2 = 0.0$
$C_4 = 1.52610 \times 10^{-4}$    $C_6 = 3.47050 \times 10^{-6}$
$C_8 = 4.35960 \times 10^{-8}$    $C_{10} = -8.99150 \times 10^{-9}$
8th surface (aspherical surface)
Standard radius of curvature: $R_8 = -4.7420$
Cone coefficient: $k = 0.46$
Aspherical surface coefficient
$C_2 = 0.0$
$C_4 = 3.29640 \times 10^{-5}$    $C_6 = 4.74550 \times 10^{-7}$
$C_8 = -5.27980 \times 10^{-8}$    $C_{10} = -5.61980 \times 10^{-9}$
14th surface (aspherical surface)
Standard radius of curvature: $R_{14} = 20.0640$
Cone coefficient: $k = -1.40$
Aspherical surface coefficient
$C_2 = 0.0$    $C_4 = 0.0$    $C_6 = 0.0$
$C_8 = -5.0000 \times 10^{-10}$    $C_{10} = 0.0$ $v_1 = 40.6$, $r_7/f_4 = 0.0912$, $d_5/f_w = 0.234$
$f_1/f_w = -1.022$, $n_1 = 1.536$, $f_w = 10.25$
$S_2(0.6 \cdot r_2)/r_2 = 0.1953$
$S_8(0.25 \cdot r_8)/r_8 = 0.03146$ where the numbers at the left end represent the surface numbers, r represents the radius of curvature, d represents the inter-surface spacing, n represents the refractive index for d-lines ($\lambda = 587.6$ nm), $v$ represents the Abbe number, x represents the visibility (diopters), m represents the magnification, $\omega$ represents the angle of incidence (°), and E.P. represents the eye point, the aspherical surfaces are indicated by the mark * at the right of the surface numbers, and the shape of the aspherical surfaces is represented by the following polynominal:

$$S(y) = \frac{y^2/R}{1 + (1 - k \cdot y^2/R^2)^{\frac{1}{2}}} + A_2 y^2 +$$

-continued $$A_4 y^4 + A_6 y^6 + A_8 y^8 + A_{10} \cdot y^{10},$$

where k is the cone coefficient, $A_n$ is the nth-order aspherical surface coefficient, and R is the standard radius of curvature, and the paraxial radius of curvature r is indicated by $r = 1/(2 \cdot A_2 + 1/R)$.

19. A Keplerian zoom finder optical system according to claim 4, which is designed in accordance with the following data:

| | | | | |
|---|---|---|---|---|
| \multicolumn{5}{l}{$x = -0.70$ Diopter $m = 0.348x - 0.634x$} |
| \multicolumn{5}{l}{$2\omega = 55.0° - 29.5°$} |
| | r | d | v | n |
| 1 | −67.3990 | 1.2000 | 35.09 | 1.574100 |
| 2* | 5.4810 | 1.7000 | | 1.000000 |
| 3 | 6.2002 | 1.7000 | 57.57 | 1.491080 |
| 4 | 11.0354 | (variable) | | 1.000000 |
| 5 | 9.2570 | 2.5000 | 57.57 | 1.491080 |
| 6 | −13.7350 | 0.3000 | | 1.000000 |
| 7 | −4.8011 | 2.0000 | 57.57 | 1.491080 |
| 8* | −4.8170 | (variable) | | 1.000000 |
| 9 | ∞ | 0.7000 | 58.80 | 1.522160 |
| 10 | ∞ | 5.0000 | | 1.000000 |
| 11 | 10.6020 | 2.7000 | 57.57 | 1.491080 |
| 12 | ∞ | 0.2000 | | 1.000000 |
| 13 | ∞ | 25.8000 | | 1.000000 |
| 14* | 19.0180 | 2.3000 | 57.57 | 1.491080 |
| 15 | −41.0030 | 16.0000 | | 1.000000 |
| 16 | E.P. | | | 1.000000 |
| m | 0.34841 | | 0.46996 | 0.63392 |
| d4 | 8.36021 | | 4.23632 | 1.17897 |
| d8 | 10.48979 | | 13.54707 | 17.67103 |

2nd surface (aspherical surface)
Standard radius of curvature: $R_2 = 5.4810$
Cone coefficient: $k = 0.8700$
Aspherical surface coefficient
$C_2 = 0.0$    $C_4 = 0.0$    $C_6 = 0.0$
$C_8 = 1.4531 \times 10^{-7}$    $C_{10} = 0.0$
8th surface (aspherical surface)
Standard radius of curvature: $R_8 = -4.8170$
Cone coefficient: $k = 0.3600$
Aspherical surface coefficient
$C_2 = 0.0$    $C_4 = 0.0$    $C_6 = 0.0$
$C_8 = 2.60780 \times 10^{-8}$    $C_{10} = 0.0$
14th surface (aspherical surface)
Standard radius of curvature: $R_{14} = 19.0180$
Cone coefficient: $k = -0.4600$
Aspherical surface coefficient
$C_2 = 0.0$    $C_4 = 0.0$    $C_6 = 0.0$
$C_8 = -5.0000 \times 10^{-10}$    $C_{10} = 0.0$ $v_1 = 35.09$, $r_7/f_4 = -0.0655$, $d_5/f_w = 0.248$
$f_1/f_w = -0.873$, $n_1 = 1.5741$, $f_w = 10.052$
$S_2(0.6 \cdot r_2)/r_2 = 0.1972$
$S_8(0.25 \cdot r_8)/r_8 = 0.03143$ where the numbers at the left end represent the surface numbers, r represents the radius of curvature, d represents the inter-surface spacing, n represents the refractive index for d-lines ($\lambda = 587.6$ nm), $v$ represents the Abbe number, x represents the visibility (diopters), m represents the magnification, $\omega$ represents the angle of incidence (°), and E.P. represents the eye point, the aspherical surfaces are indicated by the mark * at the right of the surface numbers, and the shape of the aspherical surfaces is represented by the following polynominal:

$$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} \cdot y^{10},$$

where k is the cone coefficient, $A_n$ is the nth-order aspherical surface coefficient, and R is the standard radius of curvature, and the paraxial radius of curvature r of the aspherical surfaces is indicated by $r = 1/(2 \cdot A_2 + 1/R)$.

* * * * *